(12) United States Patent
Inomori et al.

(10) Patent No.: US 8,256,597 B2
(45) Date of Patent: Sep. 4, 2012

(54) FRICTION CLUTCH AND VEHICLE EQUIPPED WITH THE SAME

(75) Inventors: Toshinori Inomori, Shizuoka (JP); Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 479 days.

(21) Appl. No.: 12/571,022

(22) Filed: Sep. 30, 2009

(65) Prior Publication Data

US 2010/0089681 A1    Apr. 15, 2010

(30) Foreign Application Priority Data

Oct. 10, 2008    (JP) .................................. 2008-264599

(51) Int. Cl.
*F16D 43/12*    (2006.01)
(52) U.S. Cl. ................. 192/70.23; 192/83; 192/105 B
(58) Field of Classification Search .............. 192/105 B, 192/103 A, 85.5
See application file for complete search history.

(56) References Cited

U.S. PATENT DOCUMENTS

| | | | | |
|---|---|---|---|---|
| 1,889,291 | A * | 11/1932 | Pirinoli ...................... | 192/105 B |
| 7,140,480 | B2 | 11/2006 | Drussel | |
| 8,037,985 | B2 * | 10/2011 | Inomori et al. ............ | 192/105 B |
| 8,113,329 | B2 * | 2/2012 | Inomori et al. ............. | 192/70.23 |
| 2005/0000775 | A1 * | 1/2005 | Drussel et al. ............. | 192/105 B |
| 2008/0029360 | A1 * | 2/2008 | Yamashita et al. .............. | 192/96 |
| 2008/0308380 | A1 | 12/2008 | Youngwerth et al. | |
| 2010/0089680 | A1 * | 4/2010 | Inomori et al. ............ | 192/70.23 |

FOREIGN PATENT DOCUMENTS

| | | |
|---|---|---|
| EP | 2 063 143 A2 | 5/2009 |
| FR | 1 080 564 A | 12/1954 |
| GB | 556 838 A | 10/1943 |
| JP | 59-13139 A | 1/1984 |
| JP | 2002-21879 A | 1/2002 |

OTHER PUBLICATIONS

Official Communication issued in corresponding European Patent Application No. 09 01 2763 completed on Nov. 25, 2010.

* cited by examiner

*Primary Examiner* — Rodney Bonck
(74) *Attorney, Agent, or Firm* — Keating & Bennett, LLP

(57) ABSTRACT

A cam face 81 and a cam face 181 are formed in such a manner that an angular velocity ω represented by the following equation increases when a parameter R increases and the angular velocity ω decreases when the parameter R decreases, $$\omega^2 = (1/m)\cdot[F(\tan\alpha + \tan\beta)/R],$$

where the mass of the centrifugal weight (41) is m, the revolution radius that is the distance from the rotation center (0) of the centrifugal weight (41) to the center of gravity of the centrifugal weight (41) is R, the angle formed by a radial line (L0) and a tangent line (L1) of a point of the cam face (81) being in contact with the centrifugal weight (41) is α, the angle formed by a radial line (L0) and a tangent line (L2) of a point in the cam face (181) being in contact with the centrifugal weight (41) is β, and the urging force of a Belleville spring that urges a roller retainer (78) is F.

8 Claims, 15 Drawing Sheets

| REF | NUMERAL | UNIT |
|---|---|---|
| $m$ | 0.5 | kg |
| $H_0$ | 40 | mm |
| $h_n$ | 9.3 | mm |
| $R_0$ | 55 | mm |
| $R_1$ | 67 | mm |
| $p$ | 4.5 | N/mm$^3$ |
| $q$ | −120 | N/mm$^2$ |
| $r$ | 800 | N/mm |

| | | |
|---|---|---|
| $a_1$ | 0.005 | mm/mm² |
| $b_1$ | -0.27 | mm/mm |
| $c_1$ | 19.725 | mm |
| $a_2$ | 0.000 | mm/mm² |
| $b_2$ | 0.00 | mm/mm |
| $c_2$ | 12.0 | mm |

FIG. 12B

| R | $y_1$ | $y_2$ | $\tan\alpha$ | $\tan\beta$ | h | F | ω |
|---|---|---|---|---|---|---|---|
| mm | mm | mm | mm/mm | mm/mm | mm | N | rad/s |
| 55.0 | 20.0 | 12.0 | 0.28 | 0.0 | 8.0 | 847 | 92.9 |
| 56.2 | 20.3 | 12.0 | 0.29 | 0.0 | 7.7 | 1011 | 103.6 |
| 57.4 | 20.7 | 12.0 | 0.30 | 0.0 | 7.3 | 1156 | 113.1 |
| 58.6 | 21.1 | 12.0 | 0.32 | 0.0 | 6.9 | 1283 | 121.4 |
| 59.8 | 21.5 | 12.0 | 0.33 | 0.0 | 6.5 | 1388 | 128.7 |
| 61.0 | 21.9 | 12.0 | 0.34 | 0.0 | 6.1 | 1472 | 134.9 |
| 62.2 | 22.3 | 12.0 | 0.35 | 0.0 | 5.7 | 1532 | 140.0 |
| 63.4 | 22.7 | 12.0 | 0.36 | 0.0 | 5.3 | 1568 | 144.1 |
| 64.6 | 23.1 | 12.0 | 0.38 | 0.0 | 4.9 | 1580 | 147.0 |
| 65.8 | 23.6 | 12.0 | 0.39 | 0.0 | 4.4 | 1568 | 148.7 |
| 67.0 | 24.1 | 12.0 | 0.40 | 0.0 | 3.9 | 1531 | 149.2 |

| | | |
|---|---|---|
| $a_1$ | 0.004 | mm/mm² |
| $b_1$ | -0.20 | mm/mm |
| $c_1$ | 18.900 | mm |
| $a_2$ | 0.002 | mm/mm² |
| $b_2$ | -0.19 | mm/mm |
| $c_2$ | 16.4 | mm |

FIG. 13A

| R | $y_1$ | $y_2$ | tanα | tanβ | h | F | ω |
|---|---|---|---|---|---|---|---|
| mm | mm | mm | mm/mm | mm/mm | mm | N | rad/s |
| 55.0 | 20.0 | 12.0 | 0.24 | 0.0 | 8.0 | 847 | 91.2 |
| 56.2 | 20.3 | 12.0 | 0.25 | 0.0 | 7.7 | 1006 | 102.0 |
| 57.4 | 20.6 | 12.1 | 0.26 | 0.0 | 7.3 | 1149 | 111.8 |
| 58.6 | 20.9 | 12.1 | 0.27 | 0.0 | 7.0 | 1276 | 120.5 |
| 59.8 | 21.2 | 12.2 | 0.28 | 0.0 | 6.6 | 1382 | 128.3 |
| 61.0 | 21.6 | 12.3 | 0.29 | 0.1 | 6.2 | 1467 | 135.1 |
| 62.2 | 21.9 | 12.3 | 0.30 | 0.1 | 5.7 | 1530 | 140.8 |
| 63.4 | 22.3 | 12.4 | 0.31 | 0.1 | 5.3 | 1568 | 145.4 |
| 64.6 | 22.7 | 12.5 | 0.32 | 0.1 | 4.9 | 1580 | 148.8 |
| 65.8 | 23.1 | 12.6 | 0.33 | 0.1 | 4.4 | 1567 | 150.9 |
| 67.0 | 23.5 | 12.6 | 0.34 | 0.1 | 3.9 | 1529 | 151.7 |

FIG. 13B

| | | |
|---|---|---|
| $a_1$ | 0 | mm/mm² |
| $b_1$ | 0.35 | mm/mm |
| $c_1$ | 0.75 | mm |
| $a_2$ | 0 | mm/mm² |
| $b_2$ | 0 | mm/mm |
| $c_2$ | 12 | mm |

FIG. 14A

| R | $y_1$ | $y_2$ | $\tan\alpha$ | $\tan\beta$ | h | F | $\omega$ |
|---|---|---|---|---|---|---|---|
| mm | mm | mm | mm/mm | mm/mm | mm | N | rad/s |
| 55.0 | 20.0 | 12.0 | 0.35 | 0.0 | 8.0 | 847 | 103.8 |
| 56.2 | 20.4 | 12.0 | 0.35 | 0.0 | 7.6 | 1044 | 115.3 |
| 57.4 | 20.8 | 12.0 | 0.35 | 0.0 | 7.2 | 1207 | 123.9 |
| 58.6 | 21.3 | 12.0 | 0.35 | 0.0 | 6.7 | 1337 | 130.4 |
| 59.8 | 21.7 | 12.0 | 0.35 | 0.0 | 6.3 | 1437 | 135.3 |
| 61.0 | 22.1 | 12.0 | 0.35 | 0.0 | 5.9 | 1510 | 138.6 |
| 62.2 | 22.5 | 12.0 | 0.35 | 0.0 | 5.5 | 1556 | 140.7 |
| 63.4 | 22.9 | 12.0 | 0.35 | 0.0 | 5.1 | 1578 | 141.7 |
| 64.6 | 23.4 | 12.0 | 0.35 | 0.0 | 4.6 | 1578 | 141.7 |
| 65.8 | 23.8 | 12.0 | 0.35 | 0.0 | 4.2 | 1557 | 140.8 |
| 67.0 | 24.2 | 12.0 | 0.35 | 0.0 | 3.8 | 1519 | 139.0 |

FIG. 14B

FRICTION CLUTCH AND VEHICLE EQUIPPED WITH THE SAME

This application claims priority under 35 U.S.C. §119 to Japanese Patent Application No. 2008-264599 filed on Oct. 10, 2008, the entire disclosure of which is incorporated herein by reference in its entirety.

BACKGROUND

1. Field of the Invention

The preferred embodiments of the present invention relate, inter alia, to a friction clutch and a vehicle equipped with the friction clutch.

2. Description of Related Art

The following description sets forth the inventor's knowledge of related art and problems therein and should not be construed as an admission of knowledge in the prior art.

Vehicles equipped with a friction clutch and a clutch operator for operating the friction clutch are conventionally known. An example of the clutch operator is a clutch lever of a motorcycle. The friction clutch has a driving-side plate and a driven-side plate. When transmitting a driving force, the driving-side plate and the driven-side plate are pushed against each other. The driving force is transmitted from the driven-side plate to the driving-side plate by the friction force produced between the driving-side plate and the driven-side plate. When disconnecting the transmission of the driving force, the clutch operator is operated so that the driving-side plate and the driven-side plate are separated from each other.

As the vehicle increases in size, the driving force to be transmitted should be increased correspondingly. Therefore, it is necessary to increase the pressing force between the driving-side plate and the driven-side plate. In view of this, a friction clutch provided with centrifugal weights has been proposed in order to assist the pressing force (see, for example, U.S. Patent Application Publication 2004/0238315). In the friction clutch provided with centrifugal weights, the centrifugal weights move radially outward in association with an increase of the engine rotation speed. A portion of the centrifugal force produced in the centrifugal weights is converted into pressing force so that the driving-side plate and the driven-side plate are pressed against each other.

However, the present inventors have found the fact that, in the vehicle provided with a clutch operator and a friction clutch having the centrifugal weights, the movements of the centrifugal weights may be transmitted to the rider through the clutch operator. The present inventors have noticed that improvements in riding feel can be achieved by controlling such sense of movements of the centrifugal weights.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a friction clutch equipped with centrifugal weights, capable of restraining movements of the centrifugal weights which may spoil riding feeling.

Among other potential advantages, some embodiments can provide a vehicle having a friction clutch equipped with centrifugal weights, capable of restraining movements of the centrifugal weights which may spoil riding feeling.

According to a first aspect embodiment of the present invention, a friction clutch a friction clutch, operated by a clutch operator, comprising: a drive-side rotator having a first plate; a driven-side rotator having a second plate facing the first plate; a pressure plate movable in a predetermined direction to bring the first plate and the second plate into contact with each other when the clutch operator is operated; a cam face formed in a side of the pressure plate that is opposite the first plate side and the second plate side; an opposing member having an opposing face that faces the cam face; a centrifugal weight arranged between the cam face and the opposing face; and an urging member for urging the centrifugal weight toward the cam face side via the opposing member, wherein an angular velocity ω represented by the following equation increases when a parameter R increases and the angular velocity ω decreases when the parameter R decreases, $$\omega^2 = (1/m) \cdot [F(\tan \alpha + \tan \beta)/R],$$

where the mass of the centrifugal weight is m, the revolution radius that is the distance from the rotation center of the centrifugal weight to the center of gravity of the centrifugal weight is R, the angle formed by a radial line and a tangent line of a point of the cam face being in contact with the centrifugal weight in the vertical cross section containing the rotation center is α, the angle formed by the radial line and a tangent line of a point in the opposing surface being in contact with the centrifugal weight in the vertical cross section containing the rotation center is β, and the urging force of the urging member that urges the opposing member in the predetermined direction is F.

According to a second aspect embodiment of the present invention, a friction clutch configured to be engaged/disengaged by an operation of a clutch operator, comprises:

a driving-side rotator having a first plate;

a driven-side rotator having a second plate facing the first plate;

a pressure plate movable in a predetermined direction to bring the first plate and the second plate into contact with each other when the clutch operator is operated;

a cam face formed on a side of the pressure plate opposite to the first plate side and the second plate side;

an opposing member having a flat surface that faces the cam face;

a centrifugal weight arranged between the cam face and the opposing member; and an urging member for urging the centrifugal weight toward the cam face side via the opposing member, wherein the cam face is formed in a concave shape against the opposing member side.

According to a third aspect embodiment of the present invention, a vehicle is equipped with the aforementioned friction clutch.

The preferred embodiments of the present invention make it possible to control the movement of the centrifugal weights that may spoil riding feel with a friction clutch having a centrifugal weight.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 11 is a table showing the specification of examples;

FIG. 12A is a table showing various constants in Example 1, and FIG. 12B is a table showing the numerical values for each parameter;

FIG. 13A is a table showing various constants in Example 2, and FIG. 13B is a table showing the numerical values for each parameter;

FIG. 14A is a table showing various constants in Comparative Example, and

FIG. 14B is a table showing the numerical values for the parameters;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

The present inventors have found the fact that the phenomenon in which the motion of the centrifugal weights can be sensed through the clutch operator by the rider occurs for the following reasons. The friction clutch provided with centrifugal weights (hereinafter referred to as a "centrifugal friction clutch") is designed so that the centrifugal weights may move radially along a cam face. In the conventional centrifugal friction clutch, however, the centrifugal weights suddenly move radially outward and come into contact with a radially outward portion of the cam violently when the rotation speed increases and then enters a predetermined rotation speed region. This slight shock resulting from the contact between the centrifugal weights and the radially outward portion of the cam is sensed by the rider.

As a result of further study, the present inventors have found that the sudden movements of the centrifugal weights at the time of entering a predetermined rotation speed region results from the shape of the cam and the spring characteristics that impart a reaction force to the centrifugal weights.

Specifically, in the centrifugal friction clutch operated by a clutch operator, the amount of the relative displacement of the drive-side plate and the driven-side plate (hereinafter referred to as a "stroke") is the total of the stroke associated with the manipulation of the clutch operator and the stroke associated with the movement of the centrifugal weights. Accordingly, a relatively longer stroke needs to be set for the centrifugal friction clutch operated by a clutch operator than a stroke required by the centrifugal friction clutch that is not operated by a clutch operator (in other words, the friction clutch engaged/disengaged only by the centrifugal weights). For this reason, a spring that has the spring characteristic such that the load characteristic does not change considerably over a wide range of the stroke region as shown in FIG. 7 (for example, a disc-spring/Belleville spring or the like) is selected as the spring for imparting a reaction force to the centrifugal weights.

Figure 7:
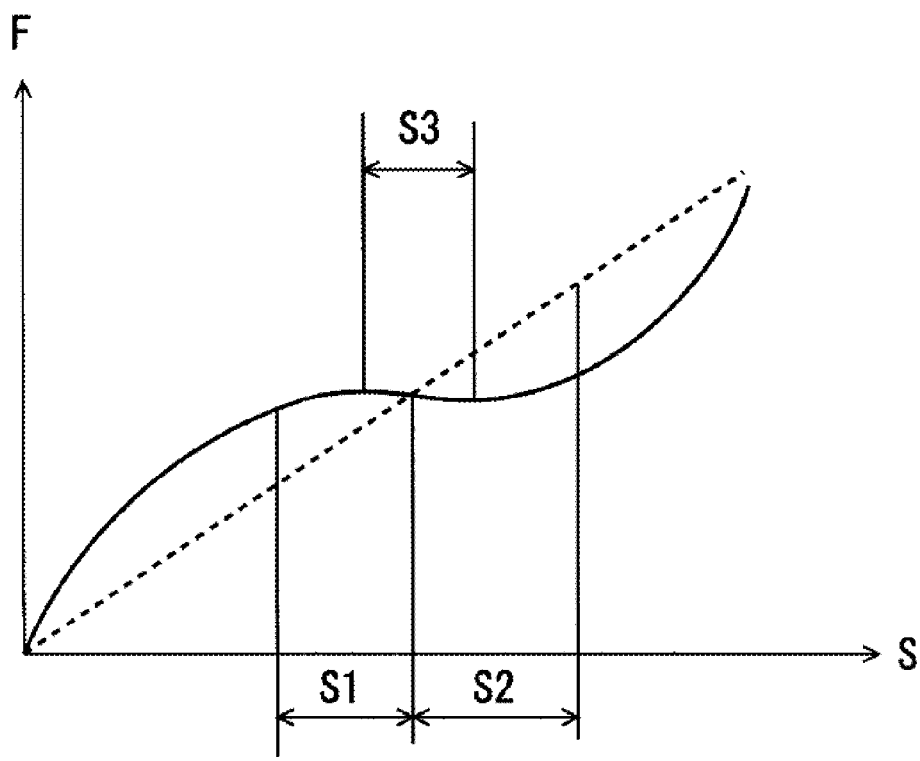
FIG. 7 is a graph illustrating spring characteristics of a disc spring.

In a centrifugal friction clutch operated by a clutch operator, as shown in FIG. 7, the centrifugal weight-originating stroke region S1 and the clutch operator-originating stroke region S2, i.e., the manually manipulated operation region S2, are arrayed from the engaged side toward the disengaged side (from the left to the right in FIG. 7). In a conventional centrifugal friction clutch, a cam is formed in a convex shape so that a sufficiently large stroke for the centrifugal weights can be ensured. In other words, the cam is formed in such a shape that the inclination angle of its radially inside portion is greater than its radially outside portion so that the centrifugal weight can move in a clutch shaft direction relatively in a large amount when the centrifugal weight moves radially from the inside to the outside.

Because of the spring characteristic and the cam shape as described above, the centrifugal weight suddenly moves radially outward when the rotation speed enters a predetermined rotation speed region. Then, the centrifugal weight makes contact with the radially outward portion of the cam violently, so the impact from the centrifugal weight is transmitted to the rider through the clutch operator.

The present invention has been accomplished based on the findings as described above. Although the details will be described later, the angular velocity ω might decreases in association with an increase in the revolution radius R of the centrifugal weight in a conventional friction clutch. This has been a cause of the sudden movement of the centrifugal weight. In contrast, the friction clutch of the present invention is configured in such a way that the angular velocity ω of the centrifugal weight increases as the revolution radius R increases and the angular velocity ω decreases as the revolution radius R decreases by, for example, forming the cam face in a concave shape. This makes it possible to prevent the sudden movement of the centrifugal weight. Hereinafter, preferred embodiments of the present invention will be described.

Embodiment 1

Hereinafter, a motorcycle 1 equipped with a friction clutch 2 according to an embodiment of the invention will be described in detail with reference to the drawings. It should be noted, however, that the motorcycle 1 and a clutch 2 described below are merely illustrative of the preferred embodiments of the present invention. The vehicle according to the present invention is not limited to the motorcycle 1 described below. The vehicles according to the present invention are not limited to motorcycles, including the so-called sport-type motorcycle, a moped, and a motor scooter, but can be other types of vehicles, such as, e.g., ATVs (All Terrain Vehicles). In the present invention, the term "motorcycle" refers to a type of vehicle whose vehicle body is to be leaned when taking a turn. The number of wheels of the motorcycle is not limited to two, but can be three or more.

Figure 1:
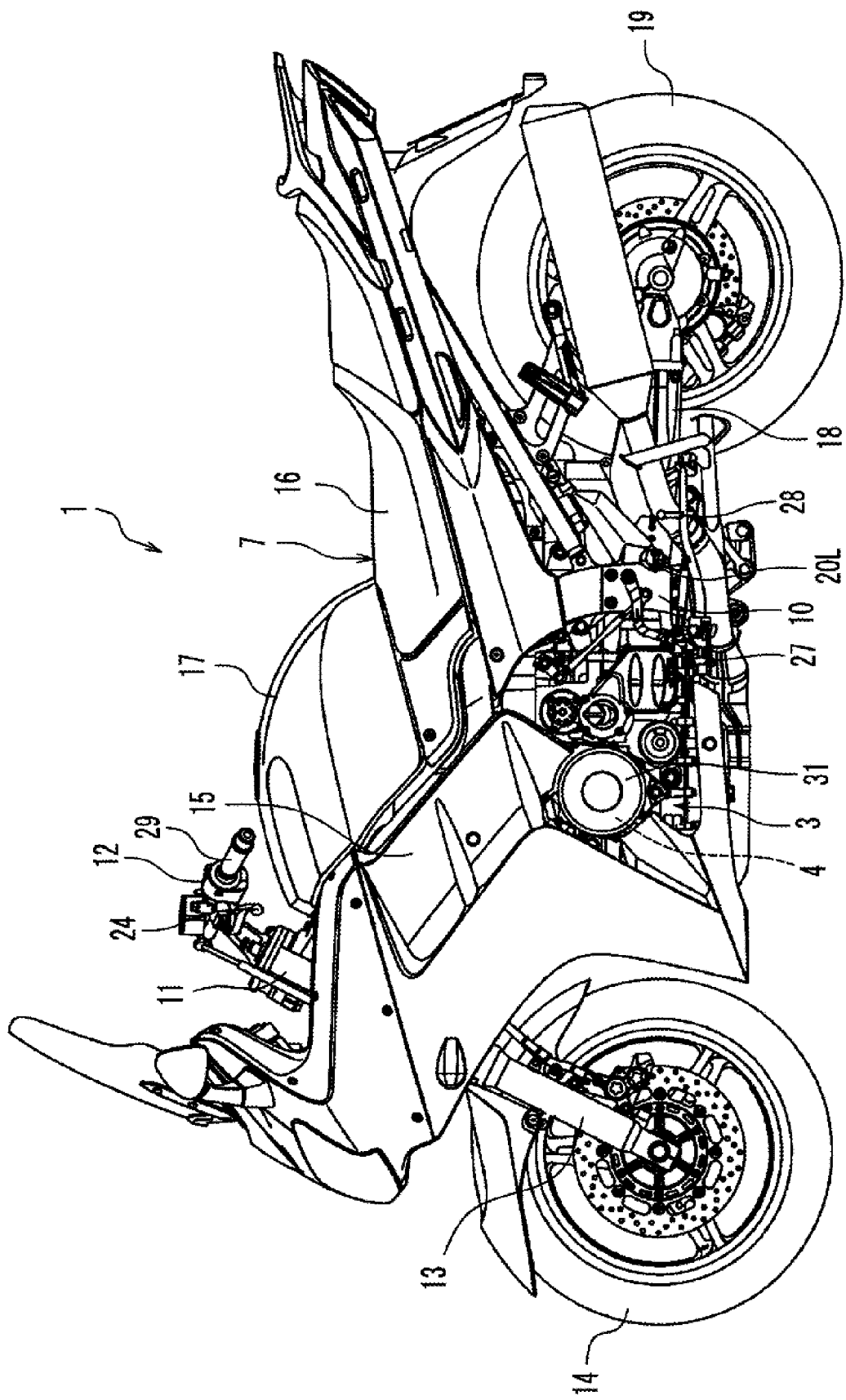
FIG. 1 is a side view of a motorcycle equipped with a friction clutch according to an embodiment of the present invention.

FIG. 1 is a left side view of a motorcycle 1. In the following description, the front, rear, right and left directions refer to the respective directions as defined based on the perspective of the rider seated on a seat 16.

Structure of Motorcycle:

As illustrated in FIG. 1, the motorcycle 1 is provided with a vehicle body 7, a front wheel 14 provided in front of the vehicle body 7, and a rear wheel 19 provided at the rear of the vehicle body 7. The vehicle body 7 includes a vehicle body frame 10. The vehicle body frame 10 has a head pipe 11. A handle bar 12 is attached to the upper end of the head pipe 11. The front wheel 14 is attached rotatably to the lower end of the head pipe 11 via front forks 13.

A power unit 3 is suspended from the vehicle body frame 10. A body cover 15 is also attached to the vehicle body frame 10. The seat 16 is arranged behind the central portion of the vehicle body 7. A fuel tank 17 is arranged in front of the seat 16.

A rear arm 18 is supported pivotally to the vehicle body frame 10. The rear wheel 19 is attached rotatably to a rear end portion of the rear arm 18. The rear wheel 19 is coupled to an engine 4 (see FIG. 2) via a power transmission mechanism, which is not illustrated in the drawing. Thereby, the power of the engine 4 is transmitted to the rear wheel 19 to rotate the rear wheel 19.

An accelerator grip, not shown in the drawing, is provided on the right side of the handle bar 12. A left grip 29 is provided on the left side of the handle bar 12. A clutch lever 24, which is to be operated for engaging/disengaging a clutch 2 (see FIG. 2), is provided in front of the left grip 29.

Footrests 20 are provided on both the left and right sides of the vehicle body 7. A shift pedal 27, which is to be operated when changing the transmission gear ratio of a transmission device 5 (see FIG. 2), is provided in front of the left side footrest 20L. A side stand 28 is provided on the right of the vehicle body 7 below the shift pedal 27 and the footrest 20L under the left-hand side of vehicle body 7.

Figure 2:
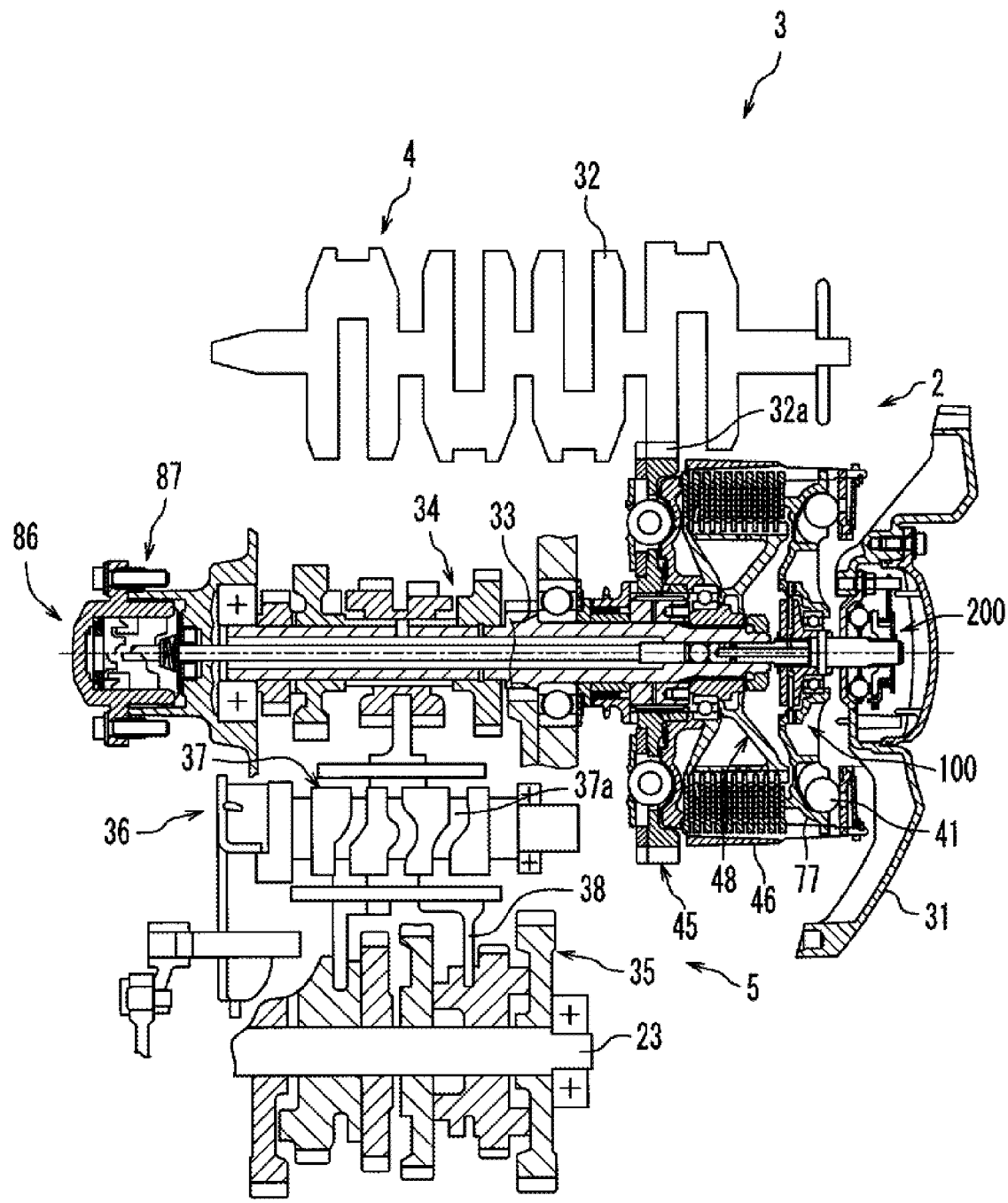
FIG. 2 is a structural view illustrating primary elements of a power unit of the motorcycle.

Structure of Power Unit:

As illustrated in FIG. 2, the power unit 3 includes the engine 4, the transmission device 5, and the clutch 2. The type of the engine 4 is not particularly limited. In this embodiment, the engine 4 is a water-cooled, four-stroke parallel four-cylinder engine.

Although not shown in the drawings, the engine 4 has four cylinders, pistons that reciprocate inside the cylinders, and a crankshaft 32 coupled to the pistons via connecting rods. The crankshaft 32 extends along a vehicle width direction. Reference numeral 31 denotes a crankcase.

The crankshaft 32 is connected to the transmission device 5 via the clutch 2. The transmission device 5 includes a main shaft 33, a drive shaft 23, and a gear selection mechanism 36. The main shaft 33 is connected to the crankshaft 32 via the clutch 2. The main shaft 33 and the drive shaft 23 are arranged in parallel with the crankshaft 32.

A plurality of transmission gears 34 are attached to the main shaft 33. A plurality of transmission gears 35 corresponding to the plurality of transmission gears 34 are attached to the drive shaft 23. The transmission gears 35 mesh with the transmission gears 34 mutually only by a pair of selected gears. At least one of unselected transmission gears 34 and 35 is capable of rotating with respect to the main shaft 33 or the drive shaft 23. The power transmission between the main shaft 33 and the drive shaft 23 is performed only via the selected transmission gears 34 and 35.

The selection of the transmission gears 34 and 35 is performed by the gear selection mechanism 36. A plurality of cam grooves 37a are formed on the outer circumferential surface of a shift cam 37. A shift fork 38 is mounted in each of the cam grooves 37a. Each shift fork 38 engages with a predetermined transmission gear 34 of the main shaft 33 and a predetermined transmission gear 35 of the drive shaft 23. In response to rotation of the shift cam 37, each of the plurality of the shift forks 38 is guided by the cam groove 37a, and moves in an axial direction of the main shaft 33. As a result, a pair of mutually engaged gears is selected out of the transmission gears 34 and 35. The gear selection mechanism 36 is operated by the shift pedal 27 (see FIG. 1).

With such a structure, when the engine 4 is operated after bringing the clutch 2 in a connected state, the power of the engine 4 is transmitted to the main shaft 33 via the clutch 2. Via a pair of predetermined transmission gears 34 and 35, the power is transmitted from the main shaft 33 to the drive shaft 23, allowing the drive shaft 23 to rotate. As the drive shaft 23 rotates, the power is transmitted to the rear wheel 19 via a transmission mechanism (not shown), such as, e.g., a chain, connected to the drive shaft 23 and the rear wheel 19. As a result, the rear wheel 19 rotates.

Structure of Clutch:

The clutch 2 is constituted by a wet-type multi-plate friction clutch. The clutch 2 is a centrifugal clutch that is automatically engaged/disengaged at the time of starting or stopping the motorcycle 1. The clutch 2 can also be operated by the rider's manual operation of the clutch lever 24. Hereinafter, the structure of the clutch 2 will be described in detail with reference to FIGS. 2, 3, and 4.

a. Clutch Housing

Figure 3:
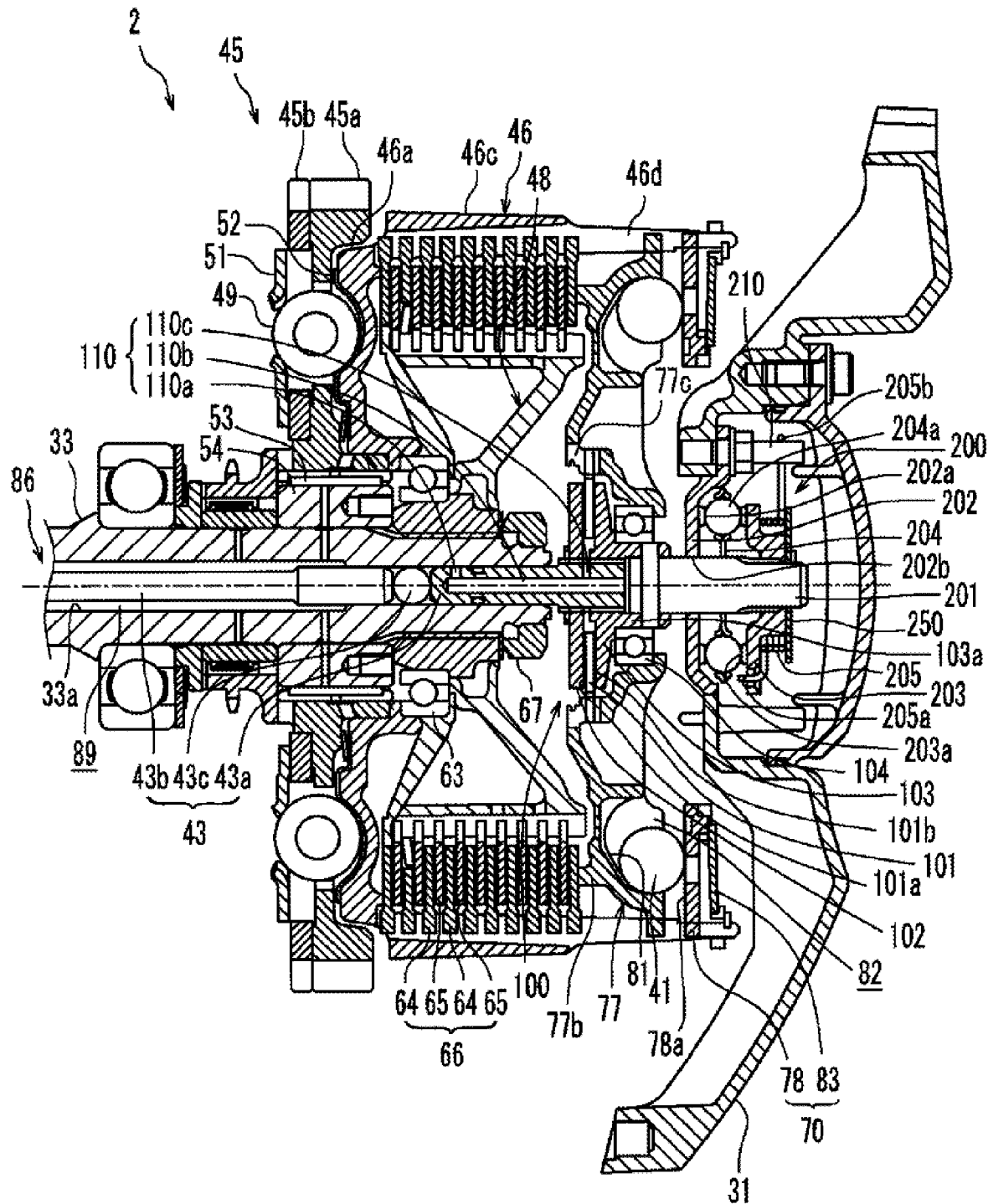
FIG. 3 is a cross-sectional view of the clutch.

As illustrated in FIG. 3, the clutch 2 has a clutch housing 46. A main shaft 33 penetrates through the clutch housing 46. The clutch housing 46 has a housing main body 46c. The housing main body 46c is formed substantially in a cylindrical shape one end of which is closed by a bottom portion 46a. The main shaft 33 is inserted through the bottom portion 46a of the housing main body 46c. The housing body 46c is provided with a plurality of pairs of arms 46d. Each of the arms 46d extends from the bottom portion 46a outwardly along the vehicle width direction (to the right in FIG. 3).

As illustrated in FIG. 3, the vehicle width direction means a lateral direction, i.e., a left-to-right/right-to-left direction. In the present embodiment, since the clutch 2 is arranged on the right side of the main shaft 33, the outside of the vehicle width direction means the right side, and the inside of the vehicle width direction means the left side. In the following description, the outside and inside of the vehicle width direction will be referred to simply as "the right side" and "the left side," respectively.

b. Scissors Gear

A scissors gear 45 is attached to the clutch housing 46. The scissors gear 45 includes two gears 45a and 45b, a spring 49, and two plates 51 and 52. The gear 45a and the gear 45b are located between the plates 51 and 52. The gear 45a and the gear 45b are configured to prevent their relative movements along the axial direction but to enable relative rotation along the circumferential direction.

A needle bearing 53 and a spacer 54, which does not rotate relative to the main shaft 33, are arranged between the scissors gear 45 and the main shaft 33. The scissors gear 45 is capable of rotating relative to the main shaft 33 via the needle bearing 53. In other words, rotation of the scissors gear 45 is not directly transmitted to the main shaft 33.

c. Clutch Boss

A clutch boss 48 is fixed to the main shaft 33 with a nut 67. The clutch boss 48 rotates together with the main shaft 33. A thrust bearing 63 is arranged between the clutch boss 48 and the scissors gear 45. Thereby, the scissors gear 45, the needle bearing 53, and the spacer 54 are restrained from coming closer to the clutch boss 48 more than a predetermined distance. In other words, movements of the scissors gear 45, the needle bearing 53, and the spacer 54 toward the clutch boss 48 are restrained.

d. Plate Group

A plurality of friction plates 64 are arranged inside the clutch housing 46. The friction plates 64 are arranged along the axial direction. Each of the friction plates 64 rotates together with the clutch housing 46. Each of the friction plates 64 is displaceable along the axial direction. For this reason, the gap between adjacent ones of the friction plates 64 is variable. Clutch plates 65 are interleaved between the respective adjacent friction plates 64. The clutch plates 65 face the friction plates 64. Each of the clutch plates 65 rotates together with the clutch boss 48. Each of the clutch plates 65 is displaceable along the axial direction, and the gap between adjacent ones of the clutch plates 65 is variable. In this embodiment, a plate group 66 is constituted by the friction plates 64 and the clutch plates 65.

e. Pressure Plate

A pressure plate 77 is arranged on the right side of the main shaft 33. The pressure plate 77 is formed in a substantially disk shape. A later-described sub-clutch 100 is provided in a center portion of the pressure plate 77. The radially outward end of the pressure plate 77 is attached to the arms 46d. The pressure plate 77 rotates together with the clutch housing 46.

A pressing part 77b projecting toward the plate group 66 side is formed in a radially outward portion of the pressure plate 77. This pressing part 77b faces the friction plate 64 that is located on the rightmost side of the plate group 66. When the pressure plate 77 moves to the left, the pressing part 77b presses the plate group 66 to the left. As a result, the friction plates 64 and the clutch plates 65 in the plate group 66 are brought into pressure contact with each other.

On the other hand, a cam face 81, which comes into contact with the centrifugal weights 41, is formed on the surface of the radially outward portion of the pressure plate 77 that is opposite to the plate group 66. A plurality of the cam faces 81 and the centrifugal weights 41 are formed along the circumferential direction. The plurality of cam faces 81 are arranged radially from the axial center of the main shaft 33. Each of the cam faces 81 slopes to the right in such a manner that its inclination angle with respect to the pressure plate surface becomes steeper and steeper toward the radially outward edge thereof. The details of the cam face 81 will be described later.

f. Roller Retainer

A roller retainer 78 is arranged on the right of the pressure plate 77. The roller retainer 78 is formed in an annular shape, when viewed in an axial direction of the main shaft 33. The roller retainer 78 is an opposing member that faces the cam faces 81 of the pressure plate 77. Thus, a space 82 that narrows toward the radially outward side of the main shaft 33 is formed by and between each of the cam faces 81 and the roller retainer 78.

Like the pressure plate 77, the radially outward end of the roller retainer 78 is fitted to the plurality of arms 46d. This makes the roller retainer 78 non-rotatable relative to the clutch housing 46. In other words, the roller retainer 78 rotates together with the clutch housing 46. On the other hand, the roller retainer 78 can change its position in terms of the axial direction of the main shaft 33 with respect to the clutch housing 46.

The roller retainer 78 is urged to the left by a disc spring/Belleville spring 83 serving as an urging member. In other words, the roller retainer 78 is urged toward the plate group 66 side by the disc spring/Belleville spring 83. The roller retainer 78 and the disc spring 83 constitute a touching member 70 that pushes the centrifugal weights 41 against the cam faces 81.

g. Centrifugal Weight

The centrifugal weights 41 are arranged respectively in a plurality of spaces 82. The centrifugal weights 41 turn around in conjunction with the rotation of the clutch housing 46, and move radially outwardly on the cam faces 81 by the centrifugal force produced at the time of the turning. When the centrifugal force exceeds a predetermined value, the centrifugal weights 41 receive a reaction force from the touching member 70, pressing the pressure plate 77 toward the plate group 66.

When the rotation speed of the crankshaft 32 is slower than a predetermined value in an idle state, for example, the rotation speed of the clutch housing 46 is also slower. For this reason, the centrifugal force acting on the centrifugal weights 41 is relatively small, and the centrifugal weights 41 will sit relatively inward. Although not shown in the drawings, the clutch 2 is provided with a spring that urges the pressure plate 77 in a direction opposite to the direction in which the plate group 66 is pressure-contacted. Therefore, when the centrifugal weights 41 sit relatively inward, the resultant force of the force with which the centrifugal weights 41 push the pressure plate 77 to the left and the urging force of the aforementioned spring will be substantially zero. As a result, the plate group 66 will be in a non pressure-contact state in which practically it is not pushed by the pressure plate 77. As a result, the torque of the clutch housing 46 is not transmitted to the clutch boss 48. In other words, the clutch 2 enters a disengaged state.

On the other hand, when the rotation speed of the crankshaft 32 becomes relatively fast, the rotation speed of the clutch housing 46 will be also relatively fast accordingly. For this reason, as the rotation speed of the clutch housing 46 increases, the centrifugal force acting on the centrifugal weights 41 increases. Then, when the centrifugal force acting on the centrifugal weights 41 exceeds a predetermined value, the centrifugal weights 41 move outward. As a result, the pressure plate 77 is pressed to the left by the centrifugal weights 41, and moves toward the plate group 66. At this time, the urging force of the above-mentioned spring is weaker than the force with which the centrifugal weights 41 push the pressure plate 77 to the left. As a result, the plate group 66 is pressure-contacted, and thus, the clutch 2 will be in an engaged state.

When the plate group 66 is compressed and the clutch 2 is engaged in this way, the torque of the clutch housing 46 is transmitted to the clutch boss 48 via the plate group 66. As a result, the clutch boss 48 rotates together with the clutch housing 46.

On the other hand, when the rotation speed of the crankshaft 32 decreases while the clutch 2 is being engaged, the centrifugal force acting on the centrifugal weights 41 will become small. As a result, the centrifugal weights 41 move radially inward. Thereby, the resultant force of the force with which the centrifugal weights 41 push the pressure plate 77 to the left and the urging force of the above-mentioned spring will become substantially zero. In other words, the force with which the pressure plate 77 presses the plate group 66 will become substantially zero. As a result, the plate group 66 becomes in a non pressure-contact state in which practically it is not pushed by the pressure plate 77. As a result, the clutch 2 is disengaged.

As described above, the motorcycle 1 is furnished with the centrifugal clutch 2. Therefore, at the time of starting or stopping the vehicle, the clutch 2 is automatically engaged/disengaged in response of the rotation speed of the engine 4. Accordingly, manual operation of the clutch lever 24 is unnecessary. Thus, in the motorcycle 1 according to the present embodiment, the rider's operation burden at the time of starting or stopping the vehicle is alleviated.

h. Cam Face

Figure 6:
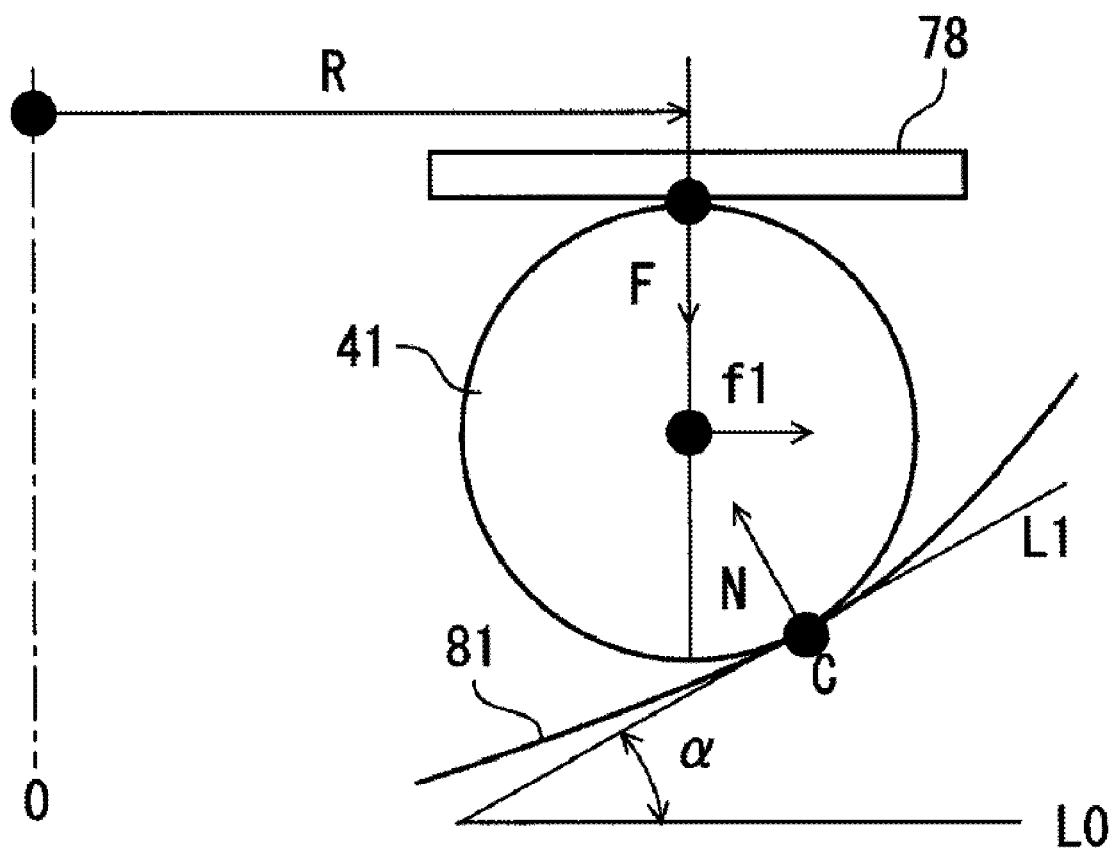
FIG. 6 is a schematic view illustrating forces acting on a cam face and a centrifugal weight in Embodiment 1.

As described above, the cam faces 81 are formed in the pressure plate 77. Next, the cam face 81 will be described in detail. FIG. 6 is a schematic view illustrating a cam face 81 and a force acting on a centrifugal weight 41. Assuming that the pressing force that the centrifugal weight 41 receives from the disc spring 83 (not shown in FIG. 6) through the roller retainer 78 is F, the reaction force that the centrifugal weight 41 receives from the cam face 81 is N, and the centrifugal force applied to the centrifugal weight 41 is f1, as illustrated in FIG. 6, the following equations hold, from the conditions with which the forces acting on the centrifugal weight 41 balance.

$$F = N \cdot \cos \alpha \quad (1)$$

$$f1 = N \cdot \sin \alpha \quad (2)$$

In the equation, the angle $\alpha$ is an angle formed by a radial line L0 and a tangent line L1 of a contact point C of the cam face 81 being in contact with the centrifugal weight 41, in the vertical cross-section containing the rotation center O.

Assuming that the mass of centrifugal weight 41 is m, the angular velocity of the rotation of the centrifugal weight 41 (i.e., the rotation of the pressure plate 77) is $\omega$, and the distance from the rotation center O to the centrifugal weight 41, i.e., the revolution radius, is R, the centrifugal force f1 is represented by the equation $f1 = m \cdot R \cdot \omega^2$. The aforementioned Equations (1) and (2) yields the following Equation (3).

$$F \cdot \tan \alpha = m \cdot R \cdot \omega^2 \quad (3)$$

Here, since the parameter m is constant, the following equation is derived from the above Equation (3).

$$(R \cdot \omega^2)/(F \cdot \tan \alpha) = \text{constant} \quad (4)$$

Therefore, in order to keep the balance of the above-mentioned forces at all times, it is necessary that the rate of increase of $F \cdot \tan \alpha$ with respect to the increase of R should exceed the rate of increase of $\omega^2$.

In this embodiment, the urging member that generates the urging force for pressing the centrifugal weight 41 onto the cam face 81 is the disc spring 83. As illustrated in FIG. 7, the disc spring 83 has such a characteristic that its load characteristic does not change considerably over a wide range of stroke region. This means that, even when the revolution radius R increases and the stroke S increases accordingly, there is a stroke region in which the urging force F does not increase significantly. In addition, depending on the type of the disc spring 83, there may be a case in which the urging force F decreases even when the revolution radius R increases and the stroke S increases accordingly. However, in Equation (4), it is possible to control the rate of increase of $F \cdot \tan \alpha$ to be greater than the rate of increase of $\omega^2$ by increasing $\tan \alpha$ as appropriate, even if the urging force F does not increase significantly. Accordingly, in this embodiment, the cam face 81 is configured to have such a shape that the rate of increase of $F \cdot \tan \alpha$ with respect to the increase of the revolution radius R exceeds the rate of increase of $\omega^2$ at all times. In this embodiment, the cam face 81 is configured to be in a concave shape.

i. Sub Clutch

As illustrated in FIG. 3, the clutch 2 has the sub-clutch 100. The sub-clutch 100 includes a friction plate 101, a first pressing plate 102 facing a left side surface 101*a* (hereafter referred to as the "first friction face") of the friction plate 101, and a second pressing plate 103 facing a right side surface 101*b* (hereafter referred to as the "second friction face") of the friction plate 101.

The friction plate 101 is configured to rotate together with the pressure plate 77. The pressure plate 77 is provided with a slide arm part 77*c*. On the other hand, a gap (not shown) is formed in a radially outward portion of the friction plate 101. The slide arm part 77*c* is attached to the gap of the friction plate 101. The friction plate 101 can slide along the axial direction with respect to the pressure plate 77.

The first pressing plate 102 is fixed to a short push rod 43*a*. Accordingly, the first pressing plate 102 is movable along the axial direction together with the short push rod 43*a*. In addition, the first pressing plate 102 rotates together with the short push rod 43*a*.

The second pressing plate 103 is serration-fitted to the short push rod 43*a*. For this reason, the second pressing plate 103 rotates together with the short push rod 43*a*, but the second pressing plate 103 is capable of relatively moving along the axial direction with respect to the short push rod 43*a*. The second pressing plate 103 has a boss portion 103*a* that extends to the right. This boss portion 103*a* rotatably supports the pressure plate 77 via a bearing 104. This allows the second pressing plate 103 and the pressure plate 77 to rotate relative to each other. The second pressing plate 103 and the pressure plate 77 are configured to move integrally along the axial direction.

When the short push rod 43*a* moves to the right, the first pressing plate 102 also moves to the right. Then, the first pressing plate 102 presses the friction plate 101 toward the second pressing plate 103. As a result, the friction plate 101 is sandwiched between the first pressing plate 102 and the second pressing plate 103. Thereby, the torque of the pressure plate 77 is transmitted to the first pressing plate 102 and the second pressing plate 103 via the friction plate 101, and the torque is applied to the first pressing plate 102 and the second pressing plate 103.

A through-hole 33*a* is formed inside the main shaft 33. The short push rod 43*a*, the ball 43*c*, and the long push rod 43*b* of the push mechanism 43 are inserted through the through-hole 33*a*. The gap space 89 between the inner wall of the through-hole 33*a* and the long push rod 43*b* serves as an oil supply path for supplying oil to the clutch 2.

Further, in the short push rod 43*a*, an oil supply path 110 is formed that guides the oil within the aforementioned gap space 89 to the sub-clutch 100. The oil supply path 110 comprises an oil introduction path (or oil introduction paths) 110a formed in a left-side part of the short push rod 43a, an oil passage 110b formed in a center portion of the short push rod 43a, and an oil discharge path (or oil discharge paths) 110c formed in a right-side part of the short push rod 43a. The oil introduction path 110a is a hole that extends radially, and it communicates with the oil passage 110b that extends along the axial direction. Likewise, the oil discharge path 110c is a hole that extends radially, and it communicates with the oil passage 110b. The outlet of the oil discharge path 110c, i.e., the radially outward opening of the oil discharge path 110c, opens toward the first friction face 101a and the second friction face 101b of the friction plate 101. Thereby, the oil within the oil supply path 110 is supplied toward the first friction face 101a and the second friction face 101b.

j. Force Boosting Mechanism

As illustrated in FIG. 3, the clutch 2 includes a force boosting mechanism 200. The force boosting mechanism 200 converts part of the torque of the pressure plate 77 into the force for disengaging the clutch 2. The force boosting mechanism 200 reduces the rider's force required for disengaging of the clutch 2. The force boosting mechanism 200 according to this embodiment is constructed by the so-called ball cam. The force boosting mechanism 200 includes a slide shaft 201 fixed to the second pressing plate 103, a first cam plate 202, a second cam plate 203, a ball plate 204, and a coil spring 205 that urges the second cam plate 203 in a direction in which the second cam plate 203 separates from the first cam plate 202. A supporting plate 250 that supports the coil spring 205 by contacting the right side part of the coil spring 205 is fixed to one end side of the slide shaft 201.

Figure 5A:
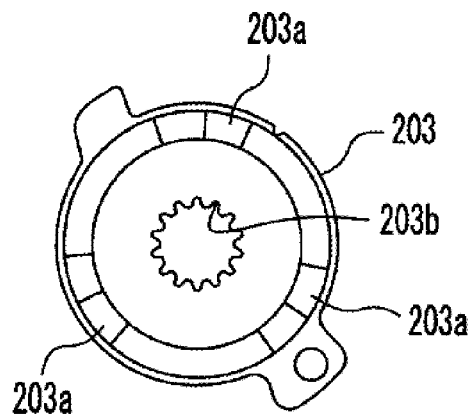
FIG. 5A is a backside view illustrating a second cam plate.
Figure 5B:
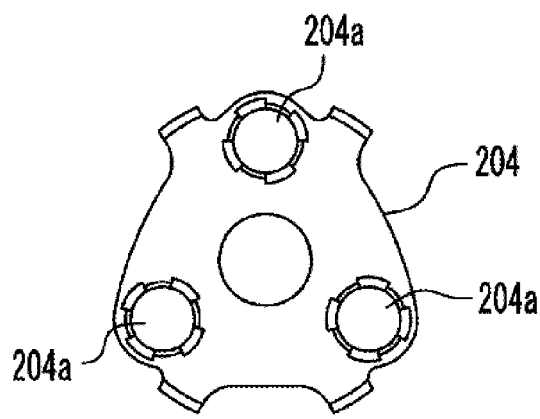
FIG. 5B is a front side view illustrating a ball plate.

As illustrated in FIG. 5B, three balls 204a are supported by the ball plate 204 so that the balls can roll freely. The three balls 204a are arranged so as to be equally spaced along the circumferential direction centered on the axial center of the slide shaft 201. It should be noted that the number of the balls 204a supported by the ball plate 204 is not limited to three.

Figure 5C:
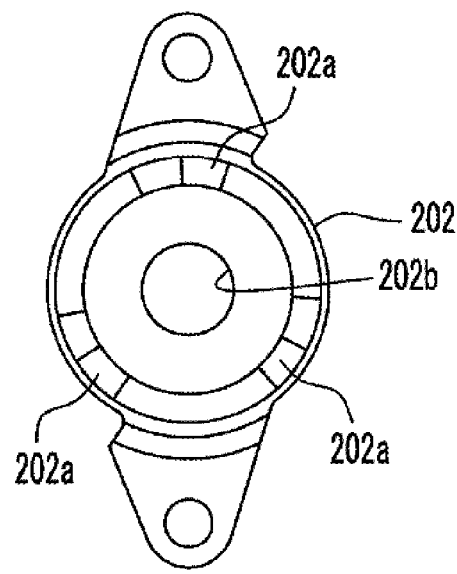
FIG. 5C is a front side view illustrating a first cam plate.

As illustrated in FIG. 5C, a through-hole 202b is formed in a central portion of the first cam plate 202. As illustrated in FIG. 3, the slide shaft 201 is inserted through the through-hole 202b. The slide shaft 201 can freely move with respect to the first cam plate 202 along the along the axial direction, and also it can freely rotate. In other words, the first cam plate 202 is configured so as not to rotate even when the slide shaft 201 rotates.

As illustrated in FIG. 5A, a serrated-hole 203b is formed in a central portion of the second cam plate 203. The second cam plate 203 is serration-fitted to the slide shaft 201. Thus, the second cam plate 203 rotates together with the slide shaft 201, although the second cam plate 203 can freely move with respect to the slide shaft 201 along the axial direction.

One end 205a of the coil spring 205 is locked to the second cam plate 203. The other end 205b of the coil spring 205 is locked to a pin 210 fixed to the crankcase 31. Thus, from the coil spring 205, the second cam plate 203 receives a torque with which it is rotated around the slide shaft 201. In addition, the second cam plate 203 receives a force such that it moves toward the first cam plate 202 side by the urging forces of the Belleville spring 83 and the coil spring 205.

First cam faces 202a are formed in the right side face of the first cam plate 202 (i.e., in the front-side face in the drawing of FIG. 5C). Second cam faces 203a are formed in the left side face of the second cam plate 203 (i.e., the front-side face in the drawing of FIG. 5A). The first cam faces 202a and the second cam faces 203a are formed in such shapes that, when the second cam plate 203 rotates in a predetermined direction, the balls 204a roll up onto the two cam faces 202a and 203a, while when the second cam plate 203 rotates in a direction opposite to the predetermined direction, the balls 204a are put into the spaces formed by and between the two cam faces 202a and 203a. In other words, the two cam faces 202a and 203a are formed so that, when the second cam plate 202 rotates in a predetermined direction against the urging forces of the disc spring 83 and the coil spring 205, the two plates 203 and 203 are pressed by the balls 204a so as to be separated from each other to cause the second cam plate 203 to move to the right. Also, the two cam faces 202a and 203a are formed so that, when the second cam plate 202 rotates in the opposite direction, the second cam plate 203 moves to the left because of the total urging forces of the disc spring 83 and the coil spring 205.

k. Clutch Release Mechanism

The clutch 2 is provided with a clutch release mechanism. The clutch release mechanism 86 forcibly releases the pressure contact state of the plate group 66 in response to the operation of the clutch lever 24 by the rider. This clutch release mechanism 86 enables disengaging of the clutch 2 by the rider's manual operation.

The clutch release mechanism 86 includes a push mechanism 43 (see FIG. 3) and a drive mechanism 87 (see FIG. 4) for driving the push mechanism 43. As illustrated in FIG. 3, the push mechanism 43 has a short push rod 43a, a long push rod 43b, and a ball 43c interposed between the short push rod 43a and the long push rod 43b. A through-hole 33a is formed inside the main shaft 33, and the push mechanism 43 is arranged inside the through-hole 33a. The through-hole 33a also serves as an oil supply hole for supplying oil to various sliding parts of the clutch 2. The oil is supplied to various sliding parts of the clutch 2 through the gap space 89 between the inner wall of the through-hole 33a and the push mechanism 43.

The right-side end of the short push rod 43a protrudes from the main shaft 33, and is attached to the first pressing plate 102 of the sub-clutch 100. Thus, when the sub-clutch 100 is connected, the short push rod 43a rotates together with the pressure plate 77. In addition, the short push rod 43a rotates together with the clutch housing 46 when the sub-clutch 100 and the clutch 2 are engaged. On the other hand, the long push rod 43b does not rotate together with the main shaft 33. For this reason, the ball 43c is provided between the short push rod 43a and the long push rod 43b to reduce the sliding resistance between the short push rod 43a and the long push rod 43b.

Figure 4:
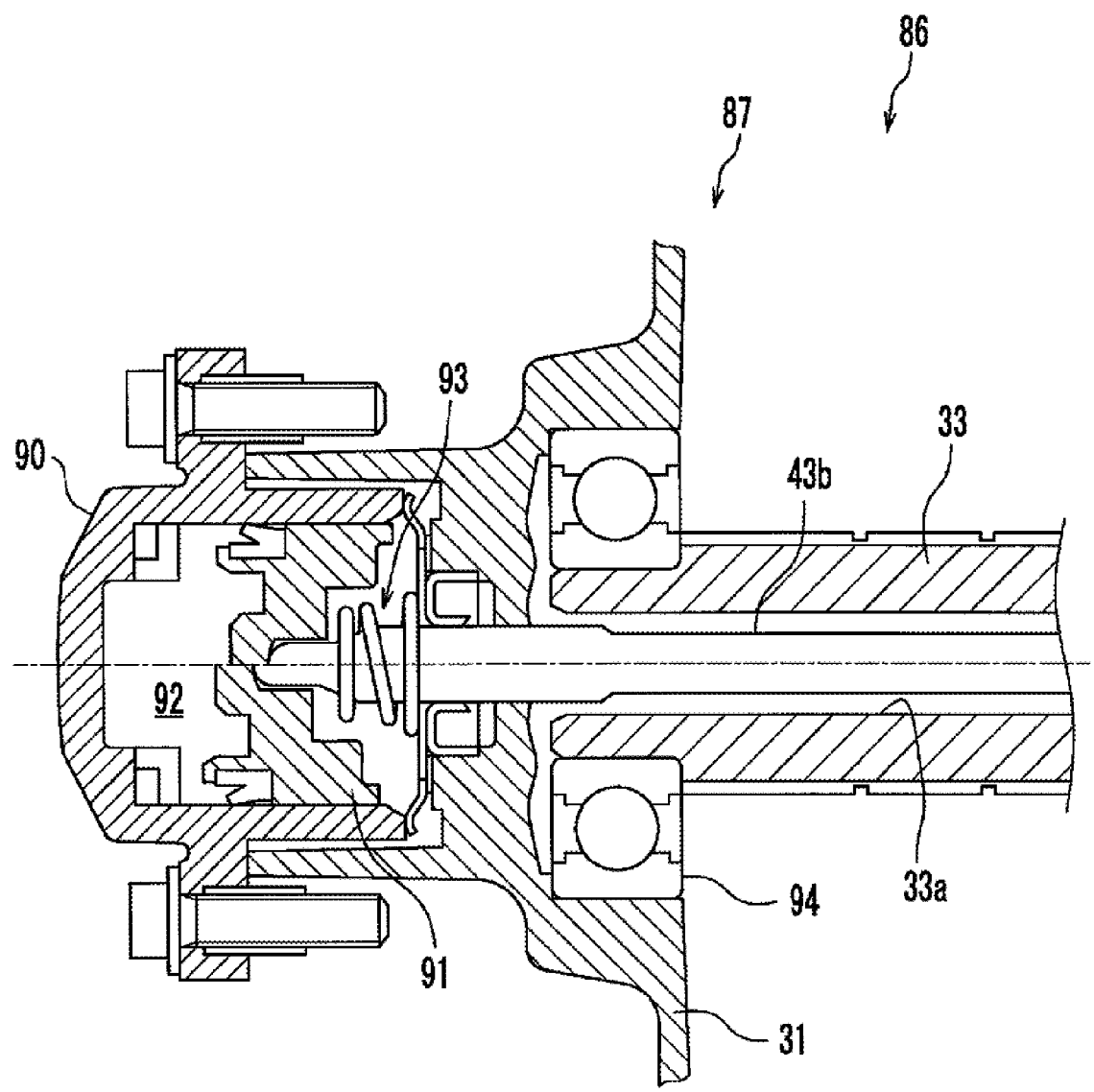
FIG. 4 is a cross-sectional view illustrating a push rod drive mechanism of the clutch.

FIG. 4 is a cross-sectional view illustrating the drive mechanism 87. As illustrated in FIG. 4, the left end of the long push rod 43b is located leftward of the left end of the main shaft 33, reaching the push rod drive mechanism 87. It should be noted that the portion below the axial center of the main shaft 33 in FIG. 4 illustrates a state in which the clutch release mechanism 86 is not driven. In other words, the portion below the axial center of the main shaft 33 in FIG. 4 illustrates the state in which the push mechanism 43 is located relatively to the left and the pressure plate 77 is not displaced to the right by the push mechanism 43. On the other hand, the portion above the axial center of the main shaft 33 in FIG. 4 illustrates a state in which the clutch release mechanism 86 is driven. In other words, the portion above the axial center of the main shaft 33 in FIG. 4 illustrates the state in which the push mechanism 43 is located relatively to the right and the pressure plate 77 is displaced to the right by the push mechanism 43.

As illustrated in FIG. 4, the drive mechanism 87 includes a cylinder 90 and a piston 91. The piston 91 is slidable with respect to the cylinder 90 in the axial directions of the main shaft 33. The piston 91 is attached to the long push rod 43b. Therefore, when the piston 91 slides, the long push rod 43b accordingly moves in the axial directions of the main shaft 33. Between the piston 91 and the cylinder 90, an operating chamber 92 is formed so as to form a partitioned space. The oil is filled in the operating chamber 92.

A compression coil spring 93 is arranged between the piston 91 and the crankcase 31. The piston 91 is urged to the left by the compression coil spring 93. In other words, the piston 91 is urged in a direction in which the push mechanism 43 is displaced to the left to engage the clutch 2. Therefore, when the clutch lever 24 (see FIG. 1) is released by the rider's operation, the push mechanism 43 moves to the left automatically.

Operation of Clutch:

Next, operation of the clutch 2 will be described. First, the operation for disengaging the clutch 2 will be described.

When the rider grips the clutch lever 24 (see FIG. 1), the internal pressure of an operation chamber 92 of a drive mechanism 87 increases. This causes the piston 91 to move to the right and also causes the long push rod 43b to move to the right. Consequently, the ball 43c and the short push rod 43a also move to the right, and the first pressing plate 102 of the sub-clutch 100 accordingly moves to the right. Thereby, the friction plate 101 of the sub-clutch 100 is sandwiched between the first pressing plate 102 and the second pressing plate 103, causing the sub-clutch 100 to be in an engaged state. Then, the slide shaft 201 of the force boosting mechanism 200 rotates together with the pressure plate 77 in a predetermined direction.

When the slide shaft 201 rotates in the predetermined direction, the second cam plate 203 of the force boosting mechanism 200 will also rotate in the same direction. Then, balls 204a in the ball plate 204 roll upward from the space between a first cam face 202a and a second cam face 203a, causing the second cam plate 203 to be pushed to the right by the balls 204a. Thereby, the slide shaft 201 is also pushed to the right. As a result, the pressure plate 77 moves to the right because of the force with which the short push rod 43a pushes the pressure plate 77 to the right via the first pressing plate 102 and the friction plate 101, and the force with which the slide shaft 201 pulls the pressure plate 77 to the right via the second pressing plate 103 and the bearing 104. Thereby, the pressure contact state of the plate group 66 is released, and the clutch 2 is disengaged.

The second cam plate 203 is restrained from rotating more than a given amount. For this reason, in the condition in which the clutch 2 is disengaged, the friction plate 101 rotates with respect to the first pressing plate 102 and the second pressing plate 103. In other words, the friction plate 101 slips with respect to the first pressing plate 102 and the second pressing plate 103. However, oil is supplied to the first friction face 101a and the second friction face 101b of the friction plate 101, and therefore, wear of the friction plate 101 is controlled.

Hereinafter, the operation for engaging the clutch 2 will be described.

To engage the clutch 2, the rider releases the clutch lever 24. Then, the internal pressure of the operation chamber 92 of the drive mechanism 87 decreases. This causes the leftward movement of the piston 91 and the long push rod 43b. Consequently, the ball 43c and the short push rod 43a also move to the left, and the first pressing plate 102 of the sub-clutch 100 accordingly moves to the left. This causes the separation of the first pressing plate 102 of the sub-clutch 100 from the friction plate 101. In addition, the second pressing plate 103 is no longer pushed rightward by the first pressing plate 102. Therefore, the rightward pressing force against the slide shaft 201 is lost, and the second cam plate 203 that receives the urging force of the coil spring 205 rotates in the opposite direction, whereby the second cam plate 203 and the slide shaft 201 move to the left. As a result, the second pressing plate 103 also moves to the left.

The rightward pressing force by the first pressing plate 102 is cancelled, the pressure plate 77 is moved to the left by the urging force of the disc spring 83 and the like. As a result, the pressure plate 77 compresses the plate group 66, allowing the clutch 2 to be engaged. In this case, the friction plate 101 of the sub-clutch 100 separates away from the second pressing plate 103.

In the clutch 2 according to this embodiment, the urging force that the pressure plate 77 receives from the disc spring 83 varies depending on the radial positions of the centrifugal weights 41. Specifically, when the rotation speed of the pressure plate 77 is fast, the centrifugal weights 41 move radially outward. As a result, the centrifugal weights 41 move to the right, causing the disc spring 83 to deform greatly. Accordingly, the urging force that the pressure plate 77 receives from the disc spring 83 becomes relatively large even without making the elastic coefficient of the disc spring 83 large, because the disc spring 83 is deformed greatly by the centrifugal weights 41. On the other hand, when the rotation speed of the pressure plate 77 is slow, the centrifugal weights 41 move radially inward. As a result, the centrifugal weights 41 move to the left, lessening the amount of deformation of the disc spring 83. For that reason, the urging force that the pressure plate 77 receives from the disc spring 83 becomes relatively small.

When the engine speed is fast, the plate group 66 needs to be compressed by the pressure plate 77 with a large pressing force. In the clutch 2 according to this embodiment, when the engine speed becomes fast, the amount of deformation of the disc spring 83 will become large in response to the radially outward movement of the centrifugal weights 41. For this reason, a sufficient pressing force can be obtained without increasing the elastic constant of the disc spring 83. Accordingly, the elastic constant, i.e., the spring capacity, of the disc spring 83 can be kept relatively small.

When the engine speed is slow, such as in an idle state, the centrifugal weights 41 move radially inward, and the pressure plate 77 will not compress the plate group 66. In other words, the clutch becomes disengaged. When the engine speed increases from the idle state, the centrifugal weights 41 eventually move radially outward, causing the pressure plate 77 to compress the plate group 66. In other words, the clutch becomes engaged. However, in the clutch 2 according to this embodiment, the elastic constant of the disc spring 83 is relatively small, the engine speed is not so fast at the moment when the clutch is engaged, and the amount of deformation of the disc spring 83 is also relatively small. Therefore, the force with which the pressure plate 77 compresses the plate group 66 is relatively small. Therefore, the plate group 66 is not compressed abruptly, and the clutch 2 can be engaged smoothly.

Advantageous Effects of the Embodiment

Figure 8:
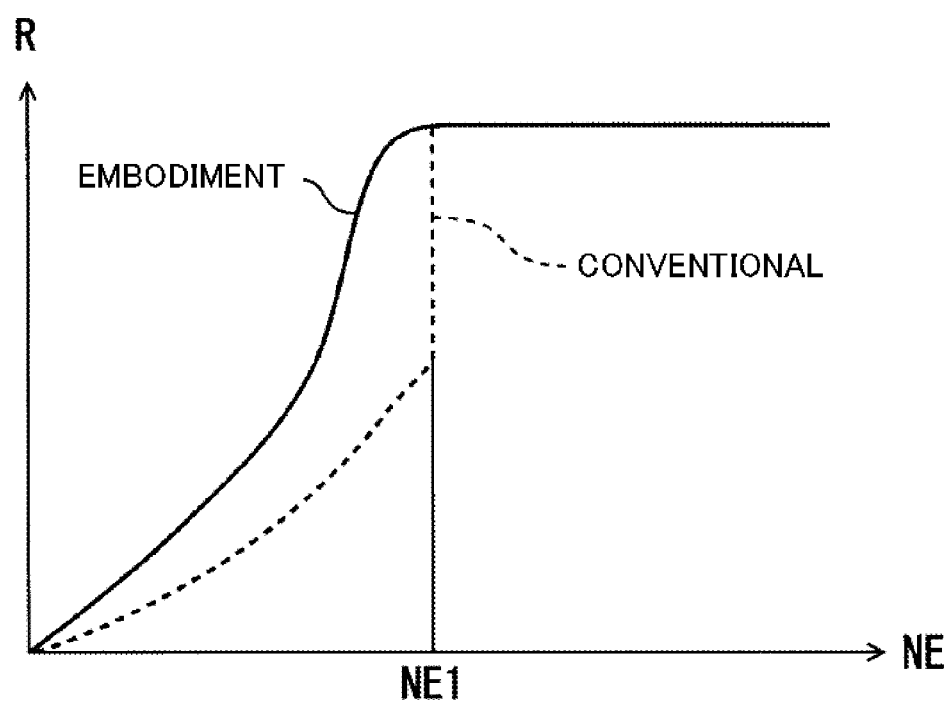
FIG. 8 is a graph illustrating the relationship between engine rotation speeds and revolution radii.

As described above, in the clutch 2 according to this embodiment, the cam face 81 that comes into contact with the centrifugal weight 41 is formed in such a shape that the rate of increase of $F \cdot \tan \alpha$ with respect to the increase of the revolution radius R exceeds the rate of increase of $\omega^2$. This prevents the centrifugal weight 41 from moving radially outward abruptly in association with an increase in the engine rotation speed. Specifically, as illustrated in FIG. 8, in a conventional clutch, the revolution radius R of the centrifugal weight 41 increases gradually in association with the increase in the engine rotation speed NE until the engine rotation speed NE reaches a predetermined rotation speed NE1. However, when the revolution radius R reaches the predetermined rotation speed NE1, the centrifugal weight 41 moves radially outward abruptly, and the revolution radius R increases abruptly. According to this embodiment, however, the abrupt radially outward movement of the centrifugal weight 41 is prevented, and the revolution radius R is prevented from increasing abruptly. This makes it possible to avoid the violent contact between the centrifugal weight 41 and the radially outward portion of the pressure plate 77, and to prevent the impact resulting from the contact from being transmitted to the rider. This embodiment makes it possible to control the movement of the centrifugal weights 41 that may spoil riding feel.

In this embodiment, the cam face 81 is configured to be in a concave shape facing the roller retainer 78 side. As a result, with a relatively simple configuration, the abrupt radially outward movement of the centrifugal weight 41 can be controlled, and the movement of the centrifugal weight 41 that may spoil riding feel can be prevented.

In the present embodiment, the urging member for urging the centrifugal weight 41 onto the cam face 81 side is the disc spring 83. As illustrated in FIG. 7, the disc spring 81 has a nonlinear characteristic, i.e., the characteristic in which the stroke S (in other words, the deformation amount) and urging force F are not directly proportional to each other. The disc spring 83 has a spring characteristic such that it has a stroke region S3 in which the urging force F becomes constant or decreases as the stroke S increases, and that the load characteristic does not change considerably over a wide range of stroke region. In addition, at least a portion of the stroke region S3 is contained in the region in which the disc spring 83 deforms in association with the operation of the clutch lever 24, i.e., in the manual operation region.

Thus, in this embodiment, the burden on the rider at the time of operating the clutch lever 24 can be alleviated by employing the disc spring 83 as an urging member. Specifically, the manual operation region S2 is adjacent to the stroke increasing side within the automatic operation region S1 (the right-hand side of FIG. 7). Assuming that a spring that has a linear spring characteristic (see, for example, the dashed line in FIG. 7) such that the load characteristic becomes large with the increase in a stroke is employed, the urging force F in the manual operation region S2 will increase along with the increase in the stroke, causing the necessary operation force required when operating the clutch lever 24 to become large. However, in this embodiment, the burden on the rider at the time of operating the clutch lever 24 can be kept small by employing the disc spring 83 as an urging member.

On the other hand, since the disc spring 83 has the above-described spring constant, the centrifugal weight 41 tends to move radially outward abruptly when the rotation speed exceeds a predetermined rotation speed. In particular, in the stroke region S3 in which the urging force F becomes constant or decreases in association with the increase in the stroke S, the centrifugal weight 41 tends to easily move radially outward abruptly. This embodiment, however, can prevent such an abrupt movement of the centrifugal weight 41. Thus, the above-described effect will be demonstrated more notably when the disc spring 81 is employed as the urging member.

Embodiment 2

In Embodiment 1, the cam faces 81 are formed only in the pressure plate 77, among the pressure plate 77 and the roller retainer 78, which sandwich the centrifugal weights 41. An opposing face 78a (see FIG. 3) of the roller retainer 78 facing the cam faces 81 is a flat surface. However, the opposing face of the roller retainer 78 may also contain a cam face. Embodiment 2 is such an embodiment in which the opposing face of the roller retainer 78 is formed with cam faces.

Figure 9:
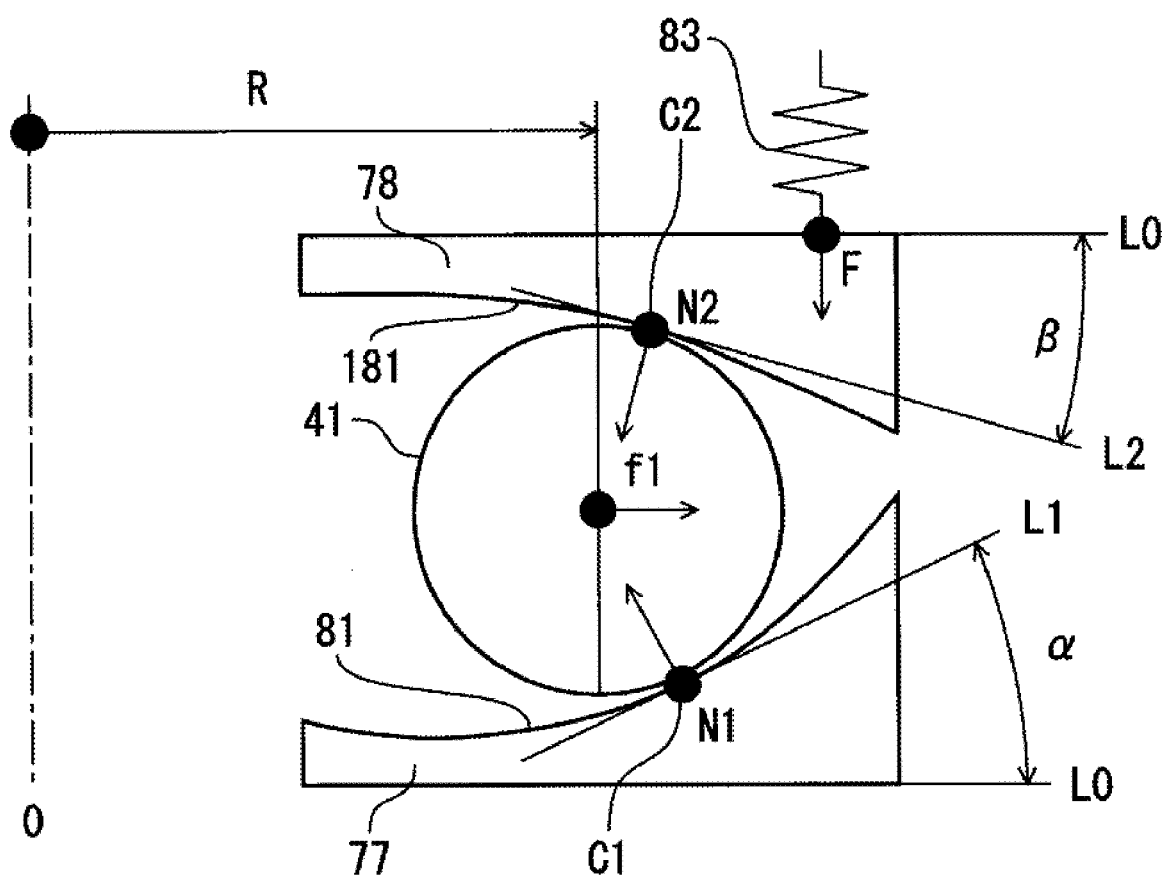
FIG. 9 is a schematic view illustrating forces acting on a cam face and a centrifugal weight in Embodiment 2.

In Embodiment 2, as illustrated in FIG. 9, the centrifugal weight 41 is arranged between the cam face 81 of the pressure plate 77 and a cam face 181 formed in the roller retainer 78. Assuming that the urging force of the disc spring 83 is F, the reaction force that the centrifugal weight 41 receives from the cam face 81 is N1, and the pressing force that the centrifugal weight 41 receives from the cam face 181 is N2, the following equations are derived:

$$F = N2 \cdot \cos \beta \quad (5)$$

from the balance of the forces along the axial direction of the roller retainer 78 (the vertical direction in FIG. 9), $$N1 \cdot \cos \alpha = N2 \cdot \cos \beta \quad (6)$$

from the balance of the forces along the same direction of the centrifugal weight 41, $$m \cdot R \cdot \omega^2 - N1 \cdot \sin \alpha - N2 \cdot \sin \beta = 0 \quad (7)$$

from the balance of the forces along the radial direction of the centrifugal weight 41 (the horizontal direction in FIG. 9).

From the above Equations (5), (6), and (7), the following Equation (8) is derived.

$$m \cdot R \cdot \omega^2 = F(\tan \alpha + \tan \beta) \quad (8)$$

The above equation (8) yields the following Equation (9).

$$\omega^2 = (1/m) \cdot [F(\tan \alpha + \tan \beta)/R] \quad (9)$$

In the equation, the angle α is an angle formed by a radial line L0 and a tangent line L1 of a contact point C1 of the cam face 81 being in contact with the centrifugal weight 41, in the vertical cross section containing the rotation center O. Likewise, the angle β is an angle formed by a radial line L0 and a tangent line L2 of a contact point C2 of the cam face 181 being in contact with the centrifugal weight 41, in the vertical cross section containing the rotation center O.

To avoid an abrupt change in the revolution radius R at the time of a change in the engine rotation speed, the angular velocity ω needs to be increased at all times when the revolution radius R is increased over the entire range of the motion of the centrifugal weight 41. Accordingly, in this embodiment, the cam face 81 and the cam face 181 are formed in such shapes that the angular velocity ω represented in the Equation (9) increases when R increases and the angular velocity ω decreases when R decreases.

The rest of the structure is identical to Embodiment 1, and therefore the description thereof will be omitted. It should be noted that if β=0 in Embodiment 2, then the configuration is the same as that in Embodiment 1. It can be said that Embodiment 2 is an embodiment in which Embodiment 1 is generalized. Of course, it is also possible to set α=0 in Embodiment 2.

The same advantageous effects as obtained in Embodiment 1 can be obtained in this embodiment as well.

Method for Confirming Whether the Embodiments are Realized

The aforementioned Equation (9) is an equation containing the mass m of the centrifugal weight 41. However, it is also possible to confirm whether the cam face 81 and the cam face 181 are formed in such shapes that the angular velocity ω increases when R increases and the angular velocity ω decreases when R decreases according to the following method.

First, it is assumed that when R increased A times, F·(tan α+tan β) increased B times and the angular velocity ω changed to ω'. Then, from the above Equation (9), the following Equation (10) is obtained.

$$\omega'^2=(1/m)\cdot[B\cdot F(\tan\alpha+\tan\beta)]/(A\cdot R)=(B/A)\cdot\omega^2 \quad (10)$$

Here, when R increases, A>1, and at this time, it is necessary that ω'² >ω². Therefore, from Equation (10), ω'$_2$/ω²=B/A>1, and after all, B>A. On the other hand, when R decreases, A<1, and at this time, it is necessary that ω'²<ω². Therefore, from Equation (10), ω'²/ω²=B/A<1, so B<A after all. It should be noted that since R does not change when A=1, so B=1, and B=A.

Thus, it can be said that the embodiments are realized if B>A when R increases and if B<A when R decreases. Thus, it is possible to check whether or not the cam faces 81 and 181 are achieved (including when one of α and β is zero) by checking the relationship between the factors A and B that are associated with the change of R, even without specifying the mass m of the centrifugal weight 41.

Other Modified Embodiments

The shape, size, and number of the centrifugal weight 41 are in no way limited. The centrifugal weight 41 can be such that it can roll along the cam face 81 or such that it can slide thereon.

In the foregoing embodiments, the pressure plate 77 comprises a single member, and the pressing part 77b and the cam face 81 are formed within the same member. However, the pressure plate 77 may comprise a plurality of members. The pressing part 77b and the cam face 81 can be formed in separate members.

The urging member can be a spring other than the disc spring, or Belleville spring, or can be other types of urging members.

Examples

Figure 10:
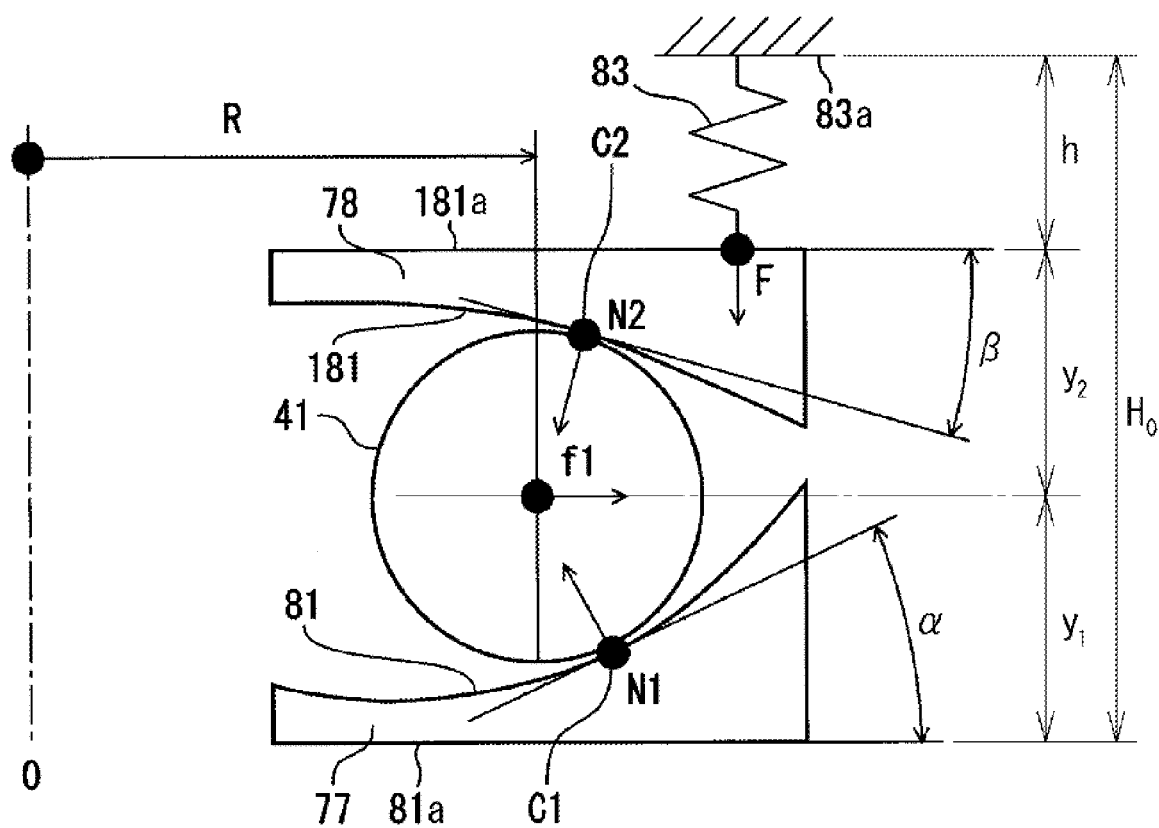
FIG. 10 is a schematic view illustrating forces acting on a cam face and a changes in spring height relative to changes in revolution radius.

As illustrated in FIG. 10, the distance from a reference face 81a of the cam face 81 to a reception face 83a of the disc spring 83 is defined as $H_0$. The distance $H_0$ is expressed by the following Equation (11).

$$H_0=h+y_1+y_2 \quad (11)$$

The parameter h is the height of the disc spring 83 when the revolution radius is R, $y_1$ is the distance from the reference face 81a to the center of the centrifugal weight 41 when the revolution radius is R, and $y_2$ is the distance from the reference face 181a of the cam face 181 when the revolution radius is R to the center of the centrifugal weight 41. The parameters h, $y_1$, and $y_2$ are the functions of R. In the clutch 2, the revolution radius R varies between a predetermined minimum value $R_0$ and a predetermined maximum value $R_1$.

The parameter $y_1$ and the angle α, and the parameter $y_2$ and the angle β have the relationships of the following Equations (12) and Equation (13), respectively.

$$\tan\alpha=dy_1/dR \quad (12)$$

$$\tan\beta=dy_2/dR \quad (13)$$

Also, as in the following Equations (14) and (15), the parameters $y_1$ and $y_2$ are defined by the quadratics of the revolution radius R.

$$y_1=a_1\cdot R^2+b_1\cdot R+c_1 \quad (14)$$

$$y_2=a_2\cdot R^2+b_2\cdot R+c_2 \quad (15)$$

The parameters $a_1$, $b_1$, $c_1$, $a_2$, $b_2$, and $c_2$ are the constants according to the shapes of the cam faces 81 and 181. The parameters $y_1$ and $y_2$ express the shapes of the cam faces 81 and 181, respectively. However, the shapes of the cam faces 81 and 181 can be expressed by other expressions.

Also, the urging force of the disc spring 83 is defined by the cubic polynomial of the height h of the disc spring 83.

$$F=p\cdot(h_n-h)^3+q\cdot(h_n-h)^2+r\cdot(h_n-h) \quad (16)$$

In the equation, $h_n$ is the natural length of the disc spring 83. The parameters p, q, and r are constants.

Substituting Equations (14) and (15) into Equations (12) and (13) yields the following Equations (17) and (18).

$$\tan\alpha=2\cdot a_1\cdot R+b_1 \quad (17)$$

$$\tan\beta=2\cdot a_2 R+b_2 \quad (18)$$

The balance of the forces along the radial direction of the centrifugal weight 41 is expressed by the foregoing Equations (8) and (9). Substituting the above Equations (11), (16), (17), and (18) into the foregoing Equation (9) leads to the following Equation (19).

$$\omega^2=(1/m\cdot R)[p(h_n-H_0+y_1+y_2)^3+q(h_n-H_0+y_1+y_2)^2+r(h_n-H_0+y_1+y_2)]\cdot[2(a_1+a_2)R+(b1+b2)] \quad (19)$$

The relationship between the revolution radius R and the angular velocity ω can be obtained by the above Equation (19).

In this example and a comparative example, the values of m, $H_0$, $h_n$, $R_0$, $R_1$, p, q, and r are as indicated in FIG. 11. Example 1 is an example of Embodiment 1, in which the constants of the cam face 81 and the cam face 181 are expressed as in FIG. 12A. FIG. 12B is a table illustrating the relationship between the revolution radius R and other parameters in Example 1. Example 2 is an example of Embodiment 2, in which the constants of the cam face 81 and the cam face 181 are expressed as in FIG. 13A. FIG. 13B is a table illustrating the relationship between the revolution radius R and other parameters in Example 2. Comparative Example is an example of the conventional friction clutch, in which the constants of the cam face 81 and the cam face 181 are expressed as in FIG. 14A. In this comparative example, the cam face 81 is an inclined flat surface and the cam face 181 is a flat surface that is not inclined. FIG. 14B is a table illustrating the relationship between the revolution radius R and other parameters in Comparative Example.

Figure 15:
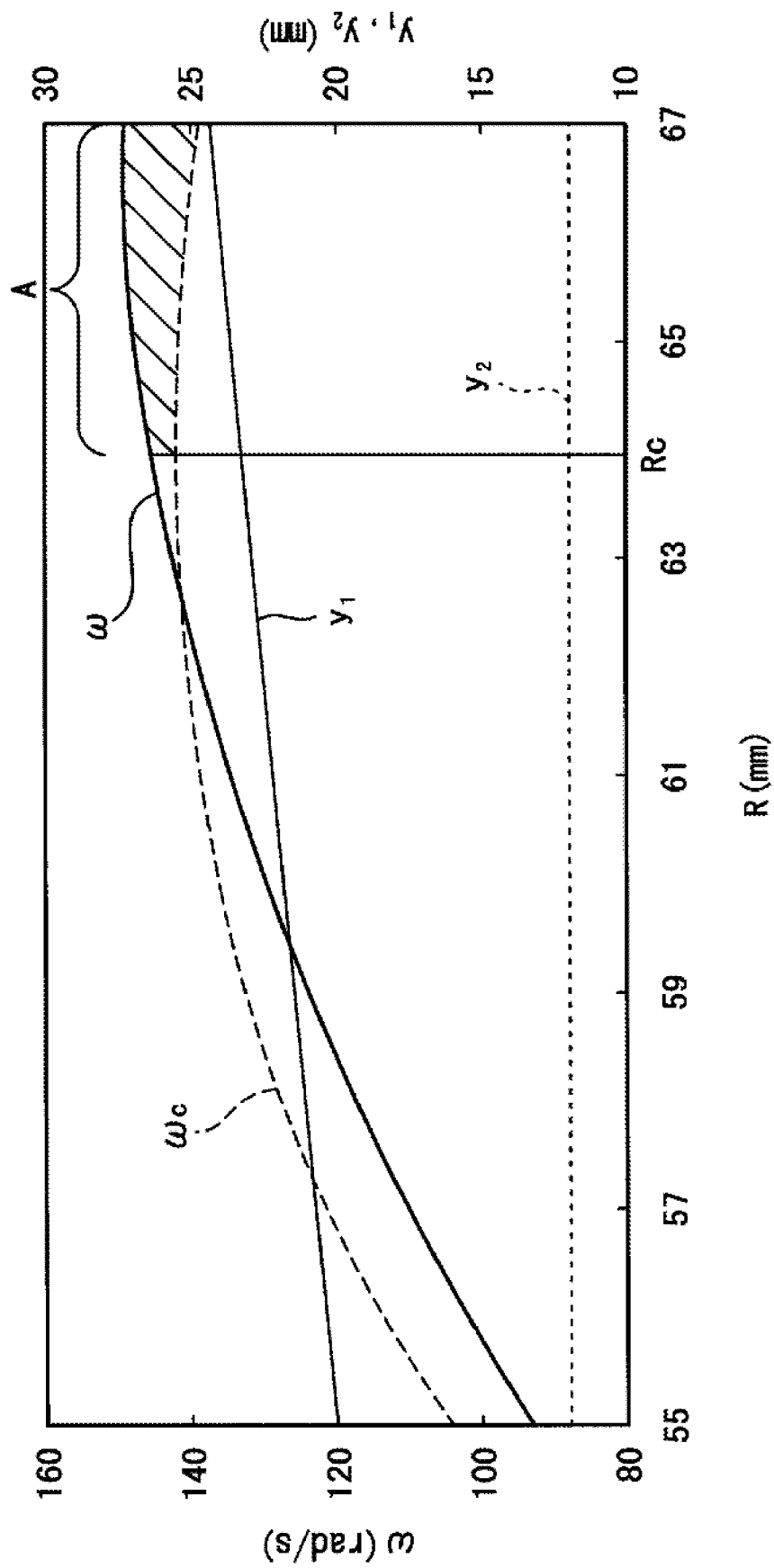
FIG. 15 is a graph illustrating the relationship between revolution radii R and angular velocities ω in Example 1.
Figure 16:
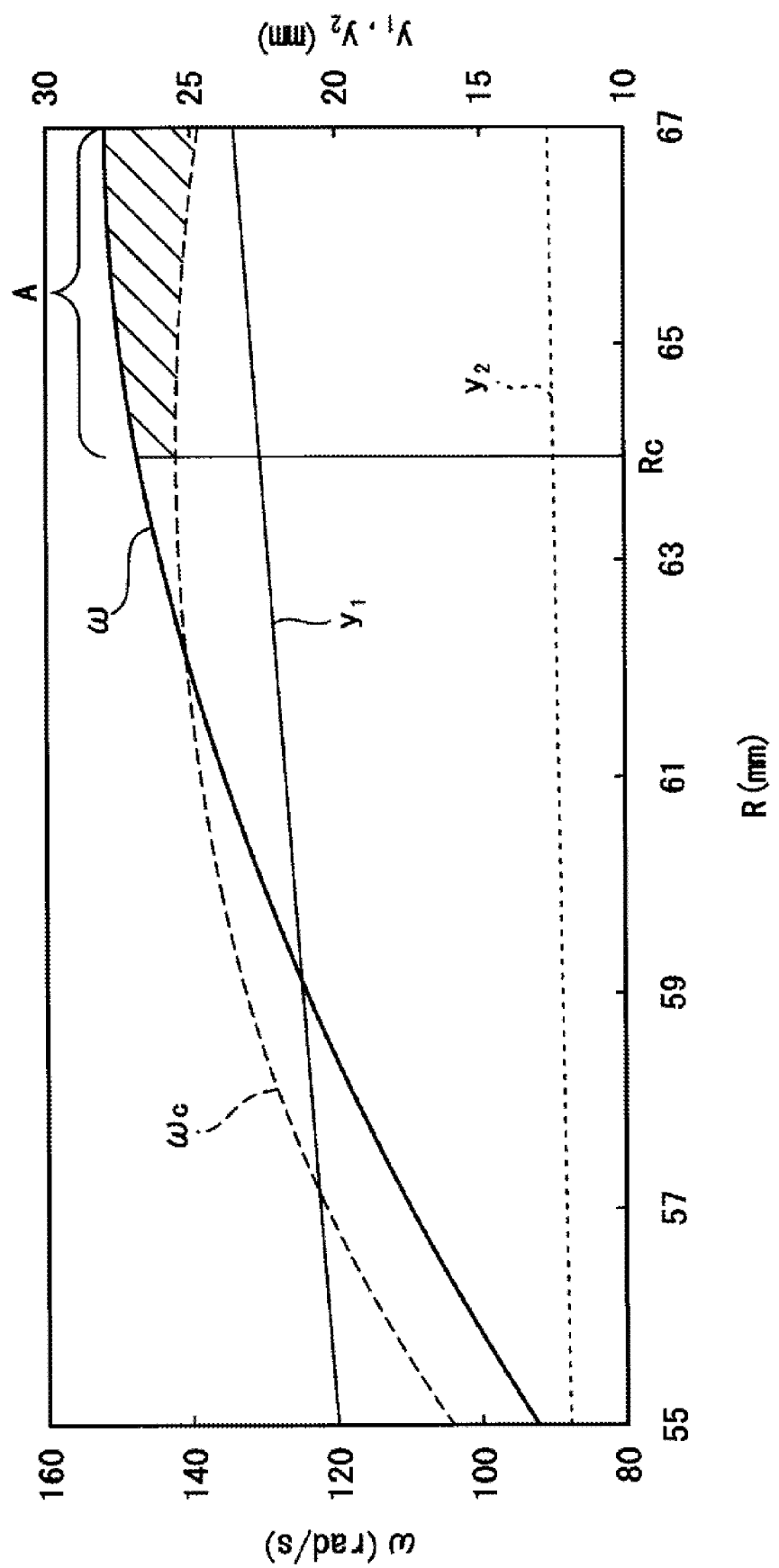
FIG. 16 is a graph illustrating the relationship between revolution radii R and angular velocities ω in Example 2.

FIG. 15 is a graph illustrating the relationship between the revolution radius R and the angular velocity in Example 1 and Comparative Example. The angular velocity of Example 1 is denoted as ω, while the angular velocity of Comparative Example is denoted as ωc. FIG. 16 is a graph illustrating the relationship between the revolution radius R and the angular velocity ω in Example 2 and Comparative Example. The angular velocity of Example 2 is denoted as ω, while the angular velocity of Comparative Example is denoted as ωc. From FIGS. 15 and 16, it is demonstrated that in Examples 1 and 2, the angular velocity ω increases when R increases, while the angular velocity ω decreases when R decreases, unlike in Comparative Example. In particular, it will be appreciated that Comparative Example shows that the angular velocity ωc decreases as the revolution radius R increases in the region in which the revolution radius R exceeds Rc, whereas Examples 1 and 2 show that the angular velocity ω increases as the revolution radius R increases in the region in which the revolution radius R exceeds Rc (see the hatched regions in FIGS. 15 and 16). The abrupt movement of the centrifugal weight is prevented because of the difference between the angular velocity ω and the angular velocity ωc.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A friction clutch configured to be engaged/disengaged by an operation of a clutch operator, comprising:
    a driving-side rotator having a first plate;
    a driven-side rotator having a second plate facing the first plate;
    a pressure plate movable in a predetermined direction to bring the first plate and the second plate into contact with each other when the clutch operator is operated;
    a cam face formed on a side of the pressure plate opposite to the first plate side and the second plate side;
    an opposing member having an opposing face that faces the cam face;
    a centrifugal weight arranged between the cam face and the opposing face; and
    an urging member for urging the centrifugal weight toward the cam face side via the opposing member,
    wherein an angular velocity ω represented by the following equation increases when a parameter R increases and the angular velocity ω decreases when the parameter R decreases,
    $\omega^2 = (1/m) \cdot [F(\tan \alpha + \tan \beta)/R]$, where the mass of the centrifugal weight is m, the revolution radius that is the distance from the rotation center of the centrifugal weight to the center of gravity of the centrifugal weight is R, the angle formed by a radial line and a tangent line of a point of the cam face being in contact with the centrifugal weight in the vertical cross section containing the rotation center is α, the angle formed by the radial line and a tangent line of a point in the opposing face being in contact with the centrifugal weight in the vertical cross section containing the rotation center is β, and the urging force of the urging member that urges the opposing member in the predetermined direction is F.

2. The friction clutch according to claim 1, wherein the urging member is a disc spring.

3. The friction clutch according to claim 1, wherein the urging member is an elastic member having a nonlinear characteristic in which the amount of deformation and the urging force are not directly proportional to each other.

4. The friction clutch according to claim 1, wherein the urging member is an elastic member having a characteristic having a deformation region in which the urging force becomes constant or decreases as the deformation amount increases.

5. The friction clutch according to claim 4, wherein at least a portion of the deformation region is contained in a region in which the elastic member deforms according to an operation of the clutch operator.

6. The friction clutch according to claim 1, wherein the opposing face is a flat surface.

7. The friction clutch according to claim 1, wherein the driving-side rotator has a plurality of the first plates, and the driven-side rotator has a plurality of the second plates.

8. A vehicle equipped with a friction clutch configured to be engaged/disengaged by an operation of a clutch operator, wherein the clutch comprises:
    a driving-side rotator having a first plate;
    a driven-side rotator having a second plate facing the first plate;
    a pressure plate movable in a predetermined direction to bring the first plate and the second plate into contact with each other when the clutch operator is operated;
    a cam face formed on a side of the pressure plate opposite to the first plate side and the second plate side;
    an opposing member having an opposing face that faces the cam face;
    a centrifugal weight arranged between the cam face and the opposing face; and
    an urging member for urging the centrifugal weight toward the cam face side via the opposing member,
    wherein the cam face is formed in a concave shape against the opposing member side, and
    wherein an angular velocity ω represented by the following equation increases when a parameter R increases and the angular velocity ω decreases when the parameter R decreases, $$\omega^2 = (1/m) \cdot [F(\tan \alpha + \tan \beta)/R],$$

where the mass of the centrifugal weight is m, the revolution radius that is the distance from the rotation center of the centrifugal weight to the center of gravity of the centrifugal weight is R, the angle formed by a radial line and a tangent line of a point of the cam face being in contact with the centrifugal weight in the vertical cross section containing the rotation center is α, the angle formed by the radial line and a tangent line of a point in the opposing face being in contact with the centrifugal weight in the vertical cross section containing the rotation center is β, and the urging force of the urging member that urges the opposing member in the predetermined direction is F.

* * * * *